United States Patent
Guo

(10) Patent No.: US 7,808,959 B2
(45) Date of Patent: Oct. 5, 2010

(54) TOPOLOGY SYSTEM OF WIRELESS NETWORK WITH DYNAMIC BALANCE

(75) Inventor: Ming-Wang Guo, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 706 days.

(21) Appl. No.: 11/724,184

(22) Filed: Mar. 15, 2007

(65) Prior Publication Data

US 2008/0225809 A1 Sep. 18, 2008

(51) Int. Cl.
*H04W 4/00* (2009.01)
*H04W 72/00* (2009.01)
*H04L 12/26* (2006.01)
*H04L 12/44* (2006.01)

(52) U.S. Cl. .................... 370/338; 370/238; 370/328; 455/453

(58) Field of Classification Search .............. 370/225, 370/338, 235, 238, 255, 326, 328, 329; 455/453
See application file for complete search history.

(56) References Cited

U.S. PATENT DOCUMENTS

| | | | |
|---|---|---|---|
| 2006/0109815 A1* | 5/2006 | Ozer et al. | 370/329 |
| 2007/0099624 A1* | 5/2007 | Guo | 455/453 |
| 2007/0189247 A1* | 8/2007 | Wang et al. | 370/338 |
| 2007/0206537 A1* | 9/2007 | Cam-Winget et al. | 370/331 |
| 2008/0112363 A1* | 5/2008 | Rahman et al. | 370/331 |
| 2008/0304427 A1* | 12/2008 | Biswas et al. | 370/255 |

* cited by examiner

*Primary Examiner*—George Eng
*Assistant Examiner*—Bryan Pitt
(74) *Attorney, Agent, or Firm*—Bacon & Thomas, PLLC

(57) ABSTRACT

The present invention is to provide a topology system of wireless network with dynamic balance comprising at least one subsidiary topology system of wireless network each having a plurality of access points and only one access point automatically becomes a root access point which operates on a channel different from others, and dynamically generates an unique derivative group ID different from others as the root access point linked with a wired network; other access points not linked with the wired network join one of subsidiary topology systems of wireless network according to loading and dataflow of the subsidiary topology systems of wireless network, and automatically become either a pure access point or an escape access point, dynamically generate an unique derivative group ID same as those linked with other root access points, and operate on a channel same as those linked with other root access points.

14 Claims, 5 Drawing Sheets

TOPOLOGY SYSTEM OF WIRELESS NETWORK WITH DYNAMIC BALANCE

FIELD OF THE INVENTION

The present invention relates to a topology system of wireless network with dynamic balance, and more particular to a topology system of wireless network which dynamically forms a subsidiary topology system thereof with high efficiency, low loading and simplicity.

BACKGROUND OF THE INVENTION

Due to that wireless network is capable of mending the defects of wired network, currently the network topology system based on the wireless network protocol of IEEE 802.11, that is, to develop topology system of wireless network according to the inter-connection framework of access points (AP for short) has become the main trend of the development of the wireless network. However, the network topology based on the wireless network protocol of IEEE 802.11 is still without a standard protocol of IEEE and even the related proposal is not decided yet for the development thereof is out of the IEEE's anticipation at the time said protocol is proposed. Thus, numerous network companies have engaged in developing their own topology system of wireless network.

A wireless network is so much different from a wired network in essence that services provided by wireless network and wired network differ from each other, and there are certain potential problems when the wireless network is integrated with wired network. Compared with the topology of wired network, most of the existing topology systems of wireless network developed by network companies are not satisfying for the users, not only inflexible but also with some problems regarding building network, generating topology and network management etc. which are also confronted and waiting for solutions when developing topology system of wireless network under wireless distribution system (hereinafter WDS for short).

Besides, the performance of a wireless network system highly depends on the topology thereof due to that the medium of a wireless network is a limited resource commonly shared and based on the scheme of carrier sense multiple access with collision avoidance (CSMA/CA for short), thus it's very important to share the wireless bandwidth efficiently. Furthermore, interference and noise can affect the transmission performance of a wireless link as well. According to related studies, one more wireless link added will cause the transmission performance to diminish by half, even the wireless network may not be optimized that it could be in busy all the time but with poor performance due to the generated topology.

To solve the problems stated above, the inventor has proposed and filed three patent applications (R.O.C. application no. 094109930, 094120743 and 094133467) which regard to give access points default address group IDs to form a topology system of wireless network and designate an access point linked with a wired network as a root access point to serve all the back-end pure access points through negotiation while other access points linked with the wired network without providing back-end service as backup access points. Thus, pure access points of the same group may determine at any time whether the root access point still exists, and when it doesn't, any one of the backup access points of the same group linked with the wired network may be designated the root access point for providing back-end service through negotiation so as to solve the problems stated above.

However, please refer to FIG. 1, the inventor has found out that under the prior art of the third embodiment of the R.O.C. application no. 094120743, when access points AP6 and AP7 are linked with the same wired network, and access point AP6 is designated as a root access point while access point AP7 as a backup access point, a loop may be prevented because access point AP7 doesn't provide link service for back-end pure access points as access point AP6 does, but access point AP6 will have to afford the dataflow of five back-end pure access points. So, regarding the topology system of wireless network mentioned above, there are still certain problems as follows:

1. Not every root access point linked with the wired network provides service to the back-end pure access points which diminishes the overall performance of the wireless network.

2. The links of the dynamic topology system of wireless network are not properly arranged, i.e. the dynamic topology system of wireless network is with high complexity which results in the overall loading thereof can't be reduced efficiently.

3. The hop count of a frame during wireless transmission is not reduced, and therefore there is still certain interference during the transmission process which diminishes the overall performance of the wireless network.

4. The loading of the root access point linked with the wired network can't be reduced efficiently (Note: The root access point is the one with the highest possibility of congestion.), and because all dataflow of the dynamic topology system of wireless network is transmitted to the wired network through the same root access point, the loading of the dynamic topology system of wireless network could be very heavy and can't be averaged (balanced).

5. The topology system of wireless network of FIG. 1 operates on a single channel which leaves other channels unused.

6. Only when default address group IDs are given to access points can the topology be formed automatically.

Hence, while a plurality of root access points are linked with a wired network, how to make a back-end access point choose an appropriate root access point to link with according to the transmission status of all kinds of signals to form a less complicated topology system of wireless network, reduce the hop count of an access point when linking with the wired network and joining said network topology so as to gain better transmission efficiency, substantially reduce system loading and probable interference, optimize the links of the wireless network, and solve the problems of wasting the bandwidth and unbalanced loading have become important issues waiting for solutions for all wireless network companies.

SUMMARY OF THE INVENTION

For the purpose of solving the problems stated above that conventionally after an access point joins a topology system of wireless network, the link established is not optimized, the bandwidth may be wasted, and the loading is not balanced, after hark work of constant and careful research, experiments, improvements and studies of all kinds of solutions, and base on years of experience and expertise regarding network devices and system development, the inventor has developed a topology system of wireless network with dynamic balance of the present invention which enables different access points to develop an optimal topology system of wireless network instantly and automatically under the operation mode of the wireless distributed system according to the characteristic of the media of the wireless network, and enables each access point of the system to link with the wired network with an optimal path, i.e. with minimum wireless hop count, and thereby accomplishes the objective of loading balance and flow control as well as forms a dynamic topology system of wireless network with high efficiency, low loading and compact topology.

One of the objectives of the present invention is to provide a topology system of wireless network with dynamic balance, wherein each access point of the topology system of wireless network is given a default address group ID in advance. The access point which hasn't established a link or has been disconnected a link will become an initial access point automatically. When an access point is linked with a wired network, it will become a root access point automatically. Each root access point dynamically generates an unique derivative group ID automatically, and operates on a channel different from those of other root access points after detection. When the initial access point not linked with a wired network links with a root access point directly or indirectly, it will become a pure access point or escape access point, and either of which is capable of generating the same derivative group ID as the root access point it links, as well as operates on the same channel as the root access point it links, and thereby different root access points and the back-end pure access point thereof will form subsidiary topology systems of wireless network respectively which do not interfere with each other.

Another objective of the present invention is to provide a topology system of wireless network with dynamic balance, wherein the initial access point of said topology system of wireless network not linked with a wired network will choose to establish a link with the access point with minimum loading and dataflow according to the current status of the access points of all roles of said topology system of wireless network. After linked with a root access point directly or indirectly, said initial access point will become a pure access point automatically if its default address group ID is the same as that of the access point it links, otherwise become an escape access point automatically. And the frames of each pure access point or escape access point are limited to be transmitted to the wired network only through the root access point with the same derivative group ID, thus objectives as loading balance and flow control may be achieved.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENT

Figure 1:
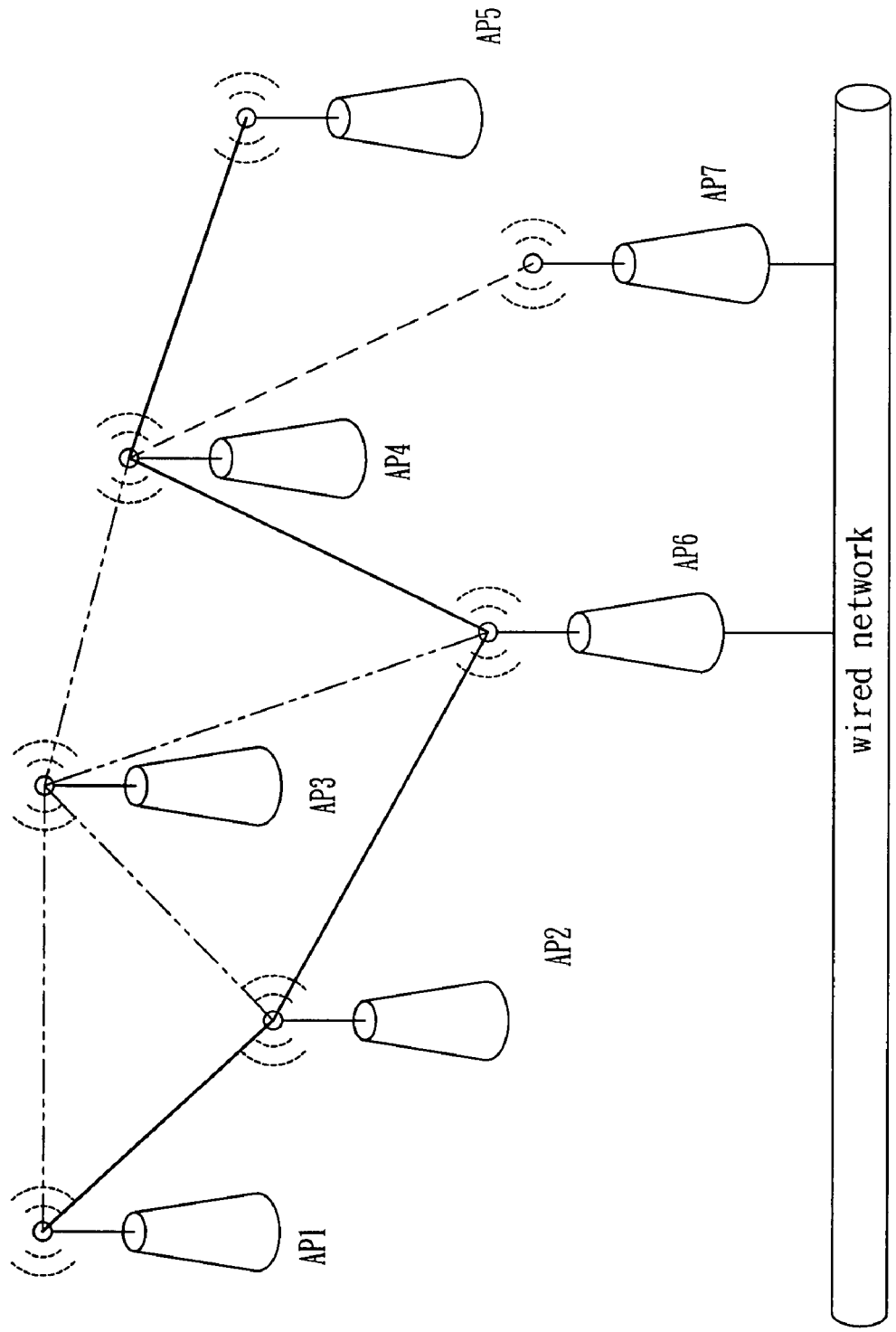
FIG. 1 shows the conventional wireless network system.

The present invention relates to a topology system of wireless network with dynamic balance, wherein each access point of the topology system of wireless network is given a default address group ID in advance. The access point which hasn't established a link or has been disconnected a link will become an initial access point automatically. When any of the initial access point is linked with a wired network, it will automatically become a root access point and dynamically generate an unique derivative group ID which is different from those of other root access points. Also, said root access point operates on a channel different from those of other root access points after detection, and declares its status of existence through broadcasting probe request frames periodically.

And according to the status of all the probe request frames received, the initial access point of said topology system of wireless network not linked with said wired network and can only receive probe request frames from other access points which already established links may establish a link with one of said access points with minimum loading and dataflow. After the link is established, if it is determined that the default address group ID of said access point is the same as that of the access point with which it established link, said access point will become a pure access point, otherwise it will become an escape access point where either the automatically generated derivative group ID of said pure access point or escape access point is the same as that of the access point with which it established link, and operates on the channel of the root access point with which it linked directly or indirectly. Besides, either said pure access point or escape access point declares its status of existence through periodically broadcasting probe request frame which is sent only through the channel of the root access point it directly or indirectly links with.

As stated above, said topology system of wireless network develops corresponding amount of subsidiary topology systems of wireless network according to the amount of the root access points linked with the wired network. And each root access point and its back-end access points (includes the pure access point and the escape access point) operate on the channel different from those utilized by other root access points and their back-end access points which keeps subsidiary topology systems of wireless network from interfering with each other. Frames of back-end access points are restricted to be transmitted to the wired network through the root access point with the same derivative group ID only, thereby loading balance and flow control can be achieved. To be emphasized, because all access points of the same subsidiary topology system of wireless network (includes root access point, pure access point and escape access point) operate on the same channel, and an initial access point scans all channels to acquire probe request frames of the access points which have established links, so said initial access point will receive all of the probe request frames as long as all access points of the same subsidiary topology system of wireless network send probe request frames through their channel.

In one embodiment of the present invention, each access point of all subsidiary topology systems of wireless network is given a current group ID respectively wherein each root access point takes the default address group ID as said current group ID while either pure access point or escape access point takes the current group ID of the root access point with which it links as its current group ID.

Furthermore, because each network device possesses an unique medium access control address (MAC address for short) as a means for distinguishing, so in said embodiment, said derivative group ID may be generated through combination of the MAC address and the current group ID of said root access point such as [MAC address_current group ID] or [current group ID_MAC address].

Moreover, said root access point may take its MAC address and current group ID as parameters to generate said derivative group ID while the derivative group ID of either said pure access point or escape access point may be generated with the MAC address and the current group ID of the root access point with which it links as its parameters. In present invention, said MAC address is for explanation rather than limitation, any identification unit in any format unique and accessible by the access point is within the scope of the present invention.

As stated above, though the current group IDs of all access points of the same subsidiary topology system of wireless network are identical, the derivative group ID of each subsidiary topology system of wireless network is different from each other, so each root access point of all subsidiary topology systems of wireless network constantly maintains the derivative group ID and uses it to distinguish and negotiate with each other so as to make each subsidiary topology system of wireless network operate on its own channel and keep them from interfering with each other.

For better understanding of features and purposes accomplished by present invention, an embodiment will be illustrated below. Please refer to FIG. 2, in this topology system of wireless network, access points AP1 to AP5 are not linked with a wired network while AP6 and AP7 link with the same wired network, wherein access point AP6 plays the role of root access point and access point AP7 becomes another root access point in said topology system of wireless network automatically. The root access point AP6 affords the dataflow of three back-end access points AP1 to AP3 while the root access point AP7 handles the dataflow of two back-end access points AP4 and AP5, thus two subsidiary topology systems of wireless network with less complexity than that of FIG. 1 are formed respectively. With AP6 and AP7 as the root access points of the two subsidiary topology systems of wireless network respectively, the loading of root access point AP6 will be less than that of root access point AP6 in FIG. 1.

Besides, the idea of management frame is applied to different access points in present invention to provide basis for physical links, i.e. the wireless links between any pair of the access points. Because communication is accomplished via the information element (IE for short) embedded in the management frame, so the access point has to maintain IE based on its setting and status, and sends out IE via the management frame properly. As a result, in present invention, an access point declares its status of existence under the wireless distribution system (hereinafter WDS for short) through generating IE, and any access point may decide whether to establish a link or not according to the IE received. The fields of an IE are defined and specified in detail as below:

a) The Element ID field: This field is necessary according to the IEEE standard and is the first field of an IE, with a length of one byte for storing the ID of the IE which can be distinguished from other used IDs.

b) The Length field: This field is also necessary according to the IEEE standard and is the second field of an IE, with a length of one byte for storing the length of the IE, i.e. the length from the third byte to the last field of the IE.

c) The Default Address Group ID (DAGID for short) field: This field is a newly added field with a length which may be fixed, and indicates the default preferred Group ID of the access point, i.e. the group with the highest priority to join. However, in practice, this field is only a reference of priority, the default group is not necessary the group joined at last. In other words, access points with the same DAGID will have higher priority to establish wireless link with each other so as to realize the idea of grouping, and it also means that each access point has the highest priority to join a specific group of access point. But under certain mode, access points with different DAGIDs may establish links with each other. Furthermore, each access point may be given a DAGID in advance which may be modified later. Moreover, each access point of a subsidiary topology system of wireless network has an unique derivative group ID which enables access points to form a topology system of wireless network automatically without any further setting, but due to the exclusiveness of the DAGID, it is necessary to maintain the DAGID in practice.

d) The Current Group ID (CGID for short) field: This field is a newly added field with a length which may be fixed, and is necessary for that it indicates the group ID of the access point during operation and enables other access points to determine whether a specific group exists and operates normally.

e) The Role of AP field: This field is a newly added field with a fixed length for indicating the role of the access point during operation. Because the role of the access point will be switched automatically, so there is no need to give this field a default value. One of this field and the Hallo field is necessary.

(1) Root access point: It means that currently the access point is linked with a wired network and may serve the back-end access point not linked with the wired network to establish a wireless link.

(2) Pure access point: It means that currently the access point is not linked with a wired network and it needs the service of other access point like a root access point, pure access point or escape access point to link with the wired network. Please refer to FIG. 2, the signal of the access point AP1 is out of reach of the root access points AP6 and AP7, so it links with the wired network indirectly through the pure access point or escape access point which is already linked with the wired network.

(3) Escape Pure (Escape for short) access point: It means that currently the access point is linked with the wired network through an access point with different DAGID. It is covered by the pure access point and not shown in FIG. 3.

(4) Initial Pure (Initial for short) access point: It means that currently the status of the access point is temporarily instable. At this time, the access point has not established a wireless link yet or the wireless link established is already cut.

Figure 3:
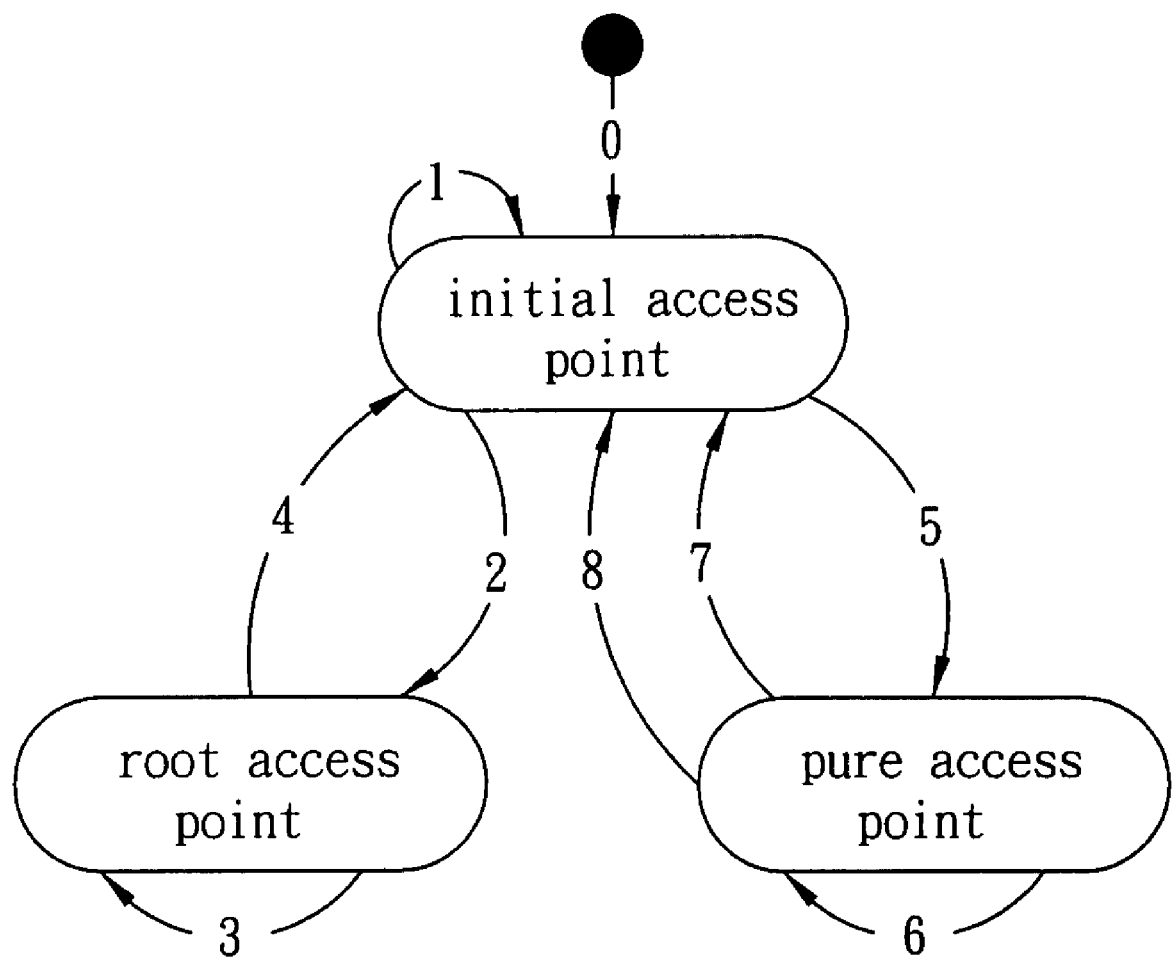
FIG. 3 shows the changes of role of an access point according to a preferred embodiment of the present invention.

Please refer to FIG. 3, the status of the Role of AP field changes as the link status of the access point, the changes of the role of the access point are illustrated below:

"0": This is the status that the access point sets the Role of AP field with the value which represents initial access point after the access point is started (i.e. powered and turned on).

"1": This is the status that under the mode of initial access point, the access point automatically scans all the channels to determine whether there exists a topology system of wireless network, when determined there isn't any other access point detected and the access point itself is not linked with a wired network directly as well, it periodically scans all the channels to determine whether there exists a root access point.

"2": This is the status that the access point is linked with a wired network and its role is changed to root access point, and may choose to operate on a channel with less interference according to the detected information of the channels occupied by other root access point.

"3": This is the status that the access point periodically detects whether the wired network exists for the root access point must be linked with a wired network.

"4": This is the status that it is detected the link with the wired network is cut, and the access point is incapable of serving back-end access points thus returns to the mode of initial access point.

"5": This is the status that the access point is not linked with a wired network and determines that there exists other root access point thus changes its role as a pure or escape access point. The process is explained in detail as below:

"5-1": This is the status that regardless the DAGID is given or not, the access point determines the root access point with the same DAGID as it is among all the root access points detected, and directly or indirectly links with the root access point with less loading according to the loading status.

"5-2": This is the status that the access point is constantly incapable of acquiring any root access point with the same DAGID as it is for it to link with a wired network, thus enters an escape access point mode so as to join a topology system of wireless network directly or indirectly via the root access point detected.

"6": This is the status that after the access point became a pure access point, it has to make sure that the root access point of the wireless topology system operates normally, if so, the mode remains. Besides, under this status, the pure access point may claim its existence in the wireless topology system and for other access point to link with so as to expand the topology system of wireless network.

"7": Contrary to the condition stated above, if it is determined that the root access point of the topology system of wireless network is no longer exists, the access point returns to the mode of initial access point.

"8": This is the status that the access point is linked with a wired network directly thus capable of serving other access point. To enhance the performance and prevent from interference, the access point will first return to the mode of initial access point for detecting which channel is available so as to choose a proper channel for operation when acting as a root access point.

f) The Hello field: This field is an optional one with a length which may be fixed for indicating the role of the access point when it sends IE. One of this field or the Role of AP field is necessary.

g) The RunOutofVport field: This field is an optional one with an unrestricted but fixed length for indicating the capability of the access point to establish new wireless links, i.e. the capability of establishing more physical wireless links. Because whether a new wireless link may be established or not depends on the number of links established so that the loading may be balanced, so this field is optional rather than necessary. Besides, while the access point is capable of establishing a new link, with this field the current loading of the access point may be acquired according to the real time dataflow which may be taken into consideration when other access point tries to establish a link. The mode of establishing a wireless link comprises:

(1) The first mode: Establishing a new wireless link with other access point is not permitted; and (2) The second mode: The access point can still establish a wireless link. Under the second mode, to use this field efficiently, the real time dataflow of the access point must be provided in this field which may be taken into consideration when other access point tries to establish a link.

h) The Sequence field: This field is a newly added field with a fixed length for indicating the sequence number of the latest IE known to show the existence of a specific group. In other words, this field is accumulated each time the root access point sends a management frame with IE, and other access point of the same group takes the maximum value of this field received as the content transmitted. This field is also necessary.

i) The MACofRootAP field: This field is a newly added field with a fixed length for indicating the MAC address of the root access point of the access point group. Since the MAC address is unique and fixed, this field is also necessary. In present invention, each root access point writes its MAC address into the MACofRootAP field directly while the back-end access point of each root access point (includes pure and escape access point) writes the MAC address of the root access point it links into the MACofRootAP field. To clarify, the MAC address may be retrieved not only from the MACofRootAP field but also other field with MAC address, and it may be combined with the current group ID to generate the derivative group ID.

j) The Channel field: This field is an optional field with an unrestricted but fixed length for indicating the operation channel of the group. Due to that there's similar channel information in other management frame, this field is not necessary.

k) The AP Management Name field: This field is an optional field and its length corresponds to the restricted length of the name so as to facilitate the network management. This field is not necessary.

l) The Escape mode (Escape access point) field: This field is an optional field with an unrestricted but fixed length for indicating whether the access point is permitted to establish a link with other access point with different DAGID to facilitate the network management. The mode of this field comprises:

(1) The first mode: The escape mode is permitted;

(2) The second mode: The escape mode is not permitted; and (3) The third mode: The escape mode is not permitted for all access points of the same group that other access points are informed of this mode through IE from the root access point instead of setting each access point of the same group. This mode has a higher priority than other modes.

m) The Hop Count field: This field is an optional field with a fixed length for indicating the amount of links of both wireless and wired an access point of the wireless network topology should pass through to link with the wired network, wherein one of the links has to be a wired link while the others are wireless ones. The mode of this field comprises:

(1) The first mode: When the access point hasn't established a link and is under a temporarily instable status, this field records the optimal hop count which indicates the minimum value of the hop count among the frames a specific access point received within the range of the signal. With this field, other access point may acquire the optimal hop count of said access point when establishing a link; and (2) The second mode: When the access point has established a link and is stable, this field records the current hop count, i.e. the amount of the links through which the access point passes to link with the wired network, wherein one of the links is a wired link while the others are wireless ones.

n) The Service Hop Count field: This field is an optional field with a fixed length for indicating that for the access point not directly linked with a wired network, the service of a specific access point is necessary for it to link with the wired network. The number of the access points which link with the wired network indirectly will be the service hop count of said specific access point. The mode of this field comprises:

(1) The first mode: When the access point hasn't established a link and is under a temporarily instable status, this field records the optimal service hop count of the access point with optimal hop count. With this field, other access point may acquire the optimal service hop count of said access point when establishing a link; and (2) The second mode: When the access point has established a link and is stable, this field records current service hop count of the access point.

o) The Unique Selection Link field: This field indicates that among all access points within the range of the signal of a specific access point, there exists only one access point with the smallest Hop Count field.

It is to be noticed that among all fields defined above, only the Element ID field and the Length field are with particular order, the order of other fields may be changed as long as the order is uniform. Except for the Element ID field and the Length field, the length of all fields may be set when needed. Besides, the IE defined under present invention comprises said fields, but during implementation, each IE may be composed of only one field or part of the fields when needed. Moreover, the derivative group ID is generated with the MAC address and the current group ID which are recorded in the MACofRootAP field and the Current Group ID field of said root access point respectively, hence in present invention, it is not necessary to add a new field in the IE to record the derivative group ID for it can be generated automatically and dynamically as long as all the access points have common scheme of combination or computation.

From the derivative group ID and Current Group ID field defined under present invention, it is clear that the idea of grouping is brought in to enable the access point to determine the attributes of other access point through the IE of the management frame, and said attributes may be taken into consideration when establishing a physical link. Due to that the access points of the group are of negotiable attributes, said determination may keep the wireless network topology from over expansion, thereby substantially reduces the complexity of the wireless network topology as well as prevents the overall performance from diminution.

In addition, access points in different regions are with different media attributes and transmission quality, keeping access points with enormous difference in attributes from establishing physical links directly enables the bandwidth of the wireless network to be utilized efficiently. For example, among all access points of different floors within the same building, access points of the same floor are with similar media attributes and transmission quality while the difference of those of access points of different floors may be obvious, to make it easier for an access point to link with other access point of the same floor will help the utilization of bandwidth of the wireless network to be more efficient.

Figure 4:
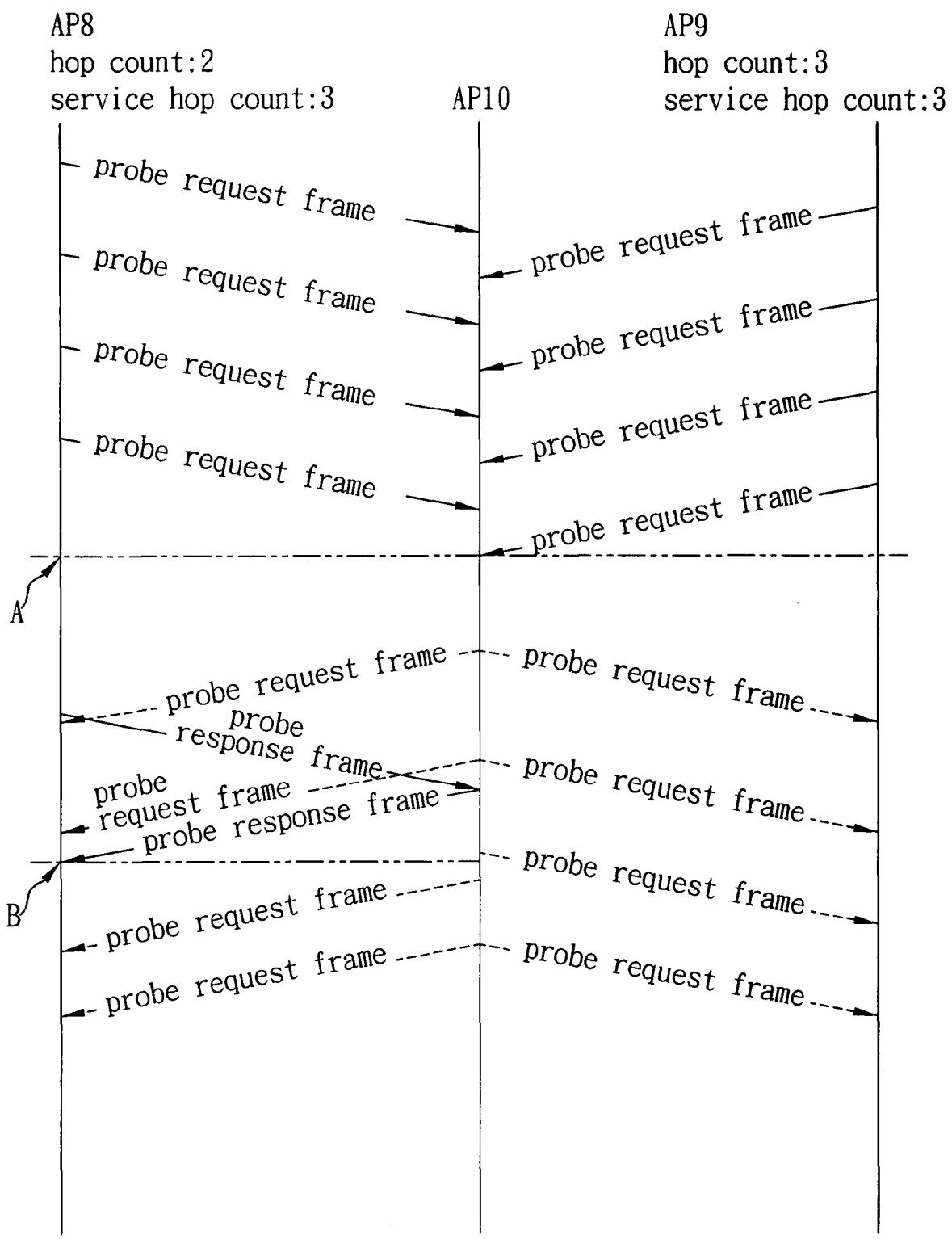
FIG. 4 shows that an access point joins a topology system of wireless network according to a preferred embodiment of the present invention.

Please refer to FIG. 4 where the case of an access point joining a topology system of wireless network is illustrated, in the first embodiment of the present invention, the access points AP8 and AP9 are pure access points, the hop count and service hop count of access point AP8 are 2 and 3 respectively, those of access point AP9 are both 3, and the ranges of signal of both access points cover access point AP10.

Both access points AP8 and AP9 have joined the topology system of wireless network, so through periodical broadcast, both access points AP8 and AP9 send probe request frames in which all fields of the IE are embedded to enable the access point AP10 to receive the probe request frames of access points AP8 and AP9 and store each field in its own database (because how to use the database and its procedure are common in the field of information engineering, so the description below is limited to the logic operations), thereby access point AP10 may determine with which access point should it establish a link according to the contents of the database. In FIG. 4, at the time of mark A, the access point AP10 determines that the service hop count of the access point AP8 is less than that of the access point AP9, i.e. the loading of the access point AP8 is lighter. So the access point AP10 will choose to establish a link with the access point AP8, fill the Hop Count field and Service Hop Count field with the same parameters received from the access point AP8, and unicast the probe request frame to the access point AP8. After said request is received, the access point AP8 will compare the Hop Count field and Service Hop Count field to determine that whether the link request is permitted (Note: Other related fields needs to be determined as well.) When affirmative, the access point AP8 unicasts the probe response frame to the access point AP10, and the access point AP10 will send a probe response frame back after said probe response frame is received (at the time of mark B in FIG. 4), then a two-way wireless link between access points AP8 and AP10 is established. Afterward, the Hop Count field of the access point AP10 will be "2 plus 1 equals 3" (one hop count more than the access point AP8), and the Service Hop Count field of the access point AP10 is modified to "0" while the Hop Count field of the access point AP8 remains "2", and the Service Hop Count field of the access point AP8 increases from "3" to "4". In FIG. 4, the hop count and the service hop count of the access point AP8 is under the status before the access point AP10 establishes the link.

Figure 5:
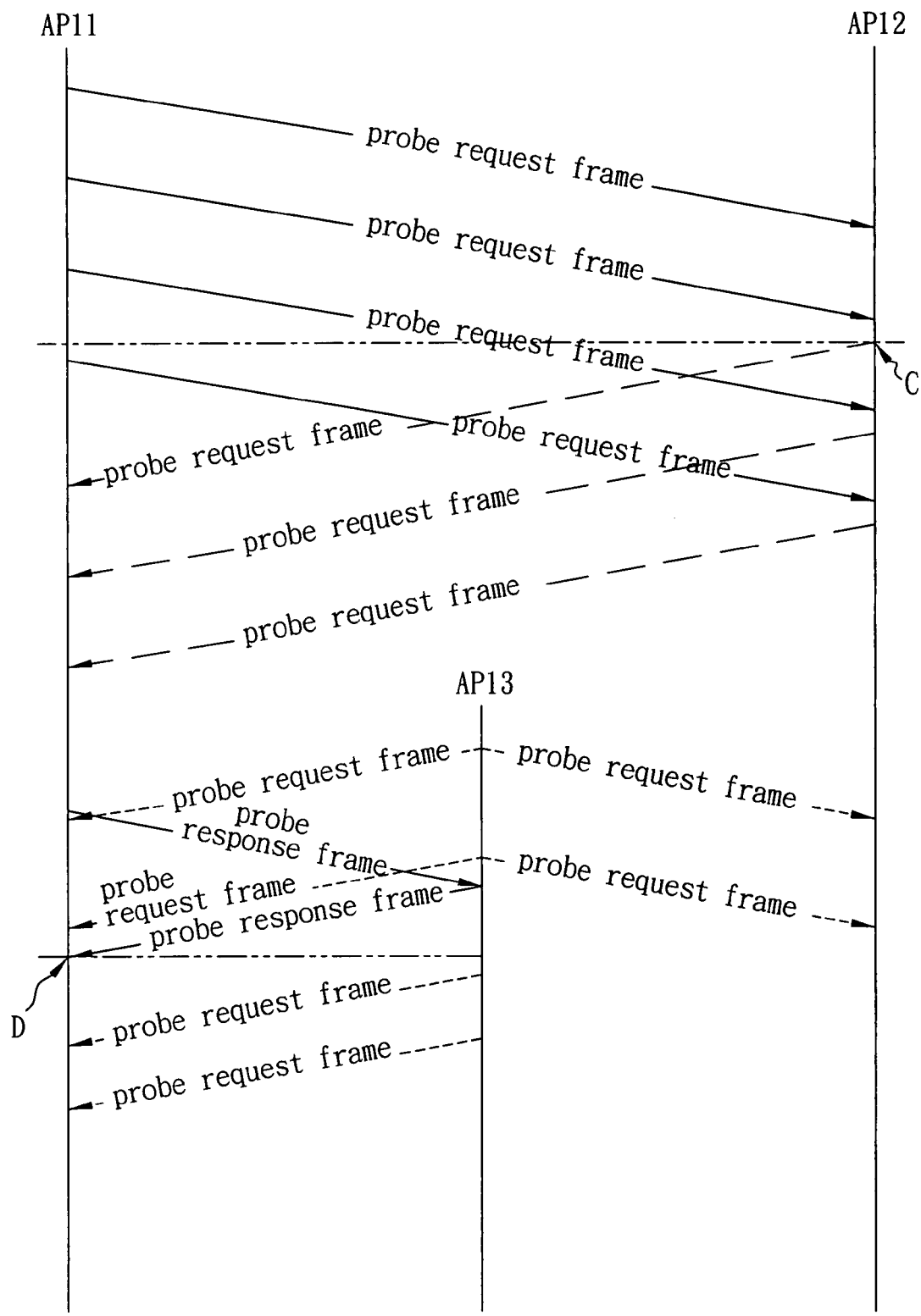
FIG. 5 shows that access points are turned on sequentially to form a topology system of wireless network according to a preferred embodiment of the present invention.

FIG. 5 illustrates the second embodiment of the present invention that each access point is turned on sequentially, and the access points AP11 and AP12 are linked with a wired network while the access point AP13 is not.

At first, when the access point AP11 is turned on before the access point AP12, the access point AP11 changes its mode to root access point on its channel because there's no other root access point detected, and declares its status of existence through broadcasting the probe request frame periodically.

Next, after the access point AP12 is turned on (at the time of mark C in FIG. 5), it scans all channels to detect the topology system of wireless network. Due to that the access point AP12 will be aware of the access point AP11 and its channel, and the access point AP12 itself is linked with the wired network either, it will change its channel to one with less interference and operate as a root access point, as well as broadcasting the probe request frame periodically like the access point AP11 does.

Figure 2:
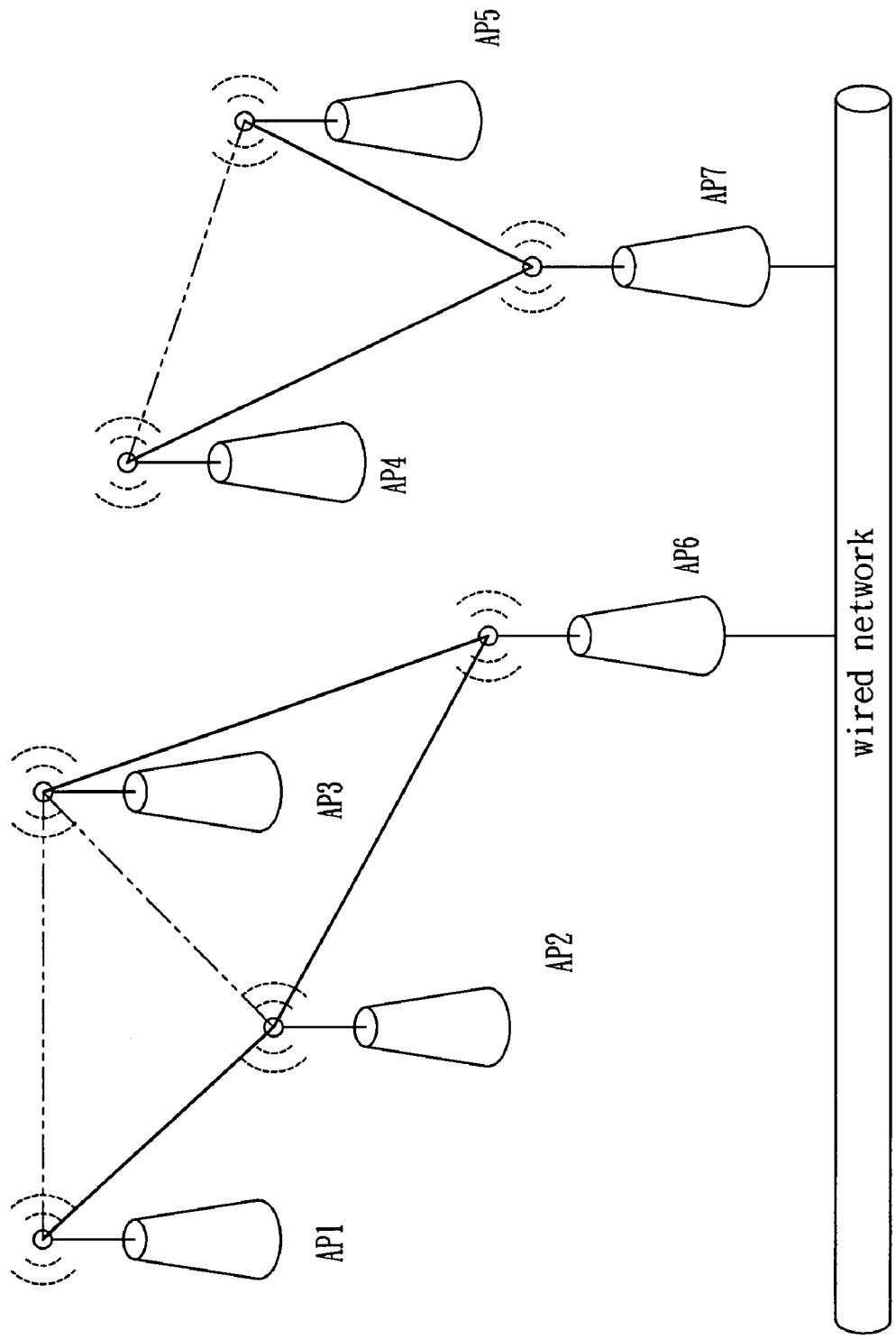
FIG. 2 shows the wireless network system of a preferred embodiment of the present invention.

Next, after the access point AP13 is turned on, the access point AP13 scans all channels as well and will be aware of the existence of the access points AP11 and AP12, and will choose a specific root access point for establishing a link according to the example illustrated in FIG. 4 (at the time of mark D in FIG. 5). Besides, the present invention brings in the idea of uniqueness of the derivative group ID that after establishes link with the access point AP11, the access point AP13 will have the same derivative group ID as the access point AP11 does, thus there won't be any link between the access points AP13 and AP12 because the derivative group ID of the access point AP12 is different from that of the subsidiary topology system of wireless network which the access point AP13 serves. Accordingly, as shown in FIG. 2, two subsidiary topology systems of wireless network which operate on channels that do not interfere with each other are formed under the case of FIG. 5.

As stated above, according to present invention, each access point may maintain the content of each field of the IE based on its setting and status and send out the IE through the management frame. While a management frame from other access point is received, each access point may determine the status of other access point according to the information embedded in the fields of the IE, decide whether to establish a physical link with it, and carry out real time update and maintenance toward the status of the physical link established. Thus, the following objectives may be achieved:

1. Every access point linked with the wired network is capable of serving the back-end access points and fully functioned, thereby the overall performance of the wireless network is enhanced.

2. The amount of links of the subsidiary topology system of wireless network is decreased and the overall wireless network system becomes less complex, thereby the loading of the topology system of wireless network will be lighter.

3. The hop count of a frame during transmission is reduced which helps the reduction of interference, thereby the overall performance of the wireless network is enhanced.

4. The loading of the access point linked with the wired network (Note: Said access point is with the highest possibility of congestion) is lighter. And due to that the network dataflow could be directed to the wired network through different wireless topology system, the loading will be balanced which makes the loading of a single system become lighter.

5. Because two subsidiary topology systems of wireless network with less complexity and operate on different channels are formed in FIG. 2, the interference between said systems may be prevented and each channel may be utilized with greater efficiency.

6. The topology may be formed automatically without any setting toward the access points (as the above description of the derivative group ID).

7. With the framework of the prior art, the present invention is capable of enhancing the conventional loading balance function, enables each access point to balance the loading dynamically as well as equips each access point with functions stated above.

While the invention herein disclosed has been described by means of specific embodiments, numerous modifications and variations could be made thereto by those skilled in the art without departing from the scope and spirit of the invention set forth in the claims.

What is claimed is:

1. A topology system of wireless network with dynamic balance, comprising:
at least a root access point formed automatically by one of a plurality of access points in said topology system when said access point is linked with a wired network, wherein each of said access points is given a default address group ID in advance, said access point which hasn't established a link or has been disconnected from a link is turned into an initial access point automatically, and said root access point dynamically generates an unique derivative group ID, operates on a channel different from those of the other root access points after detection and periodically declares status thereof in said wireless network;

at least a pure access point formed automatically after said initial access point establishes a link with another of the plurality of access points having a minimum loading and dataflow according to statuses received from each of said access points which has established a link, wherein said pure access point generates said derivative group ID identical to that of said root access point linked therewith directly or indirectly, operates on said channel identical to that of said root access point linked therewith directly or indirectly, and declares status thereof periodically in said wireless network;

at least an escape access point formed automatically after said initial access point establishes a link with said root access point or said pure access point having a minimum loading and dataflow according to statuses received from said root access point or said pure access point, wherein said default address group ID of said escape access point is different from those of said root access points or said pure access points linked therewith, and said escape access point dynamically and automatically generates said derivative group ID identical to that of said root access point linked therewith, operates on said channel identical to that of said root access point linked therewith, and declares status thereof periodically in said wireless network;

a probe request frame being broadcasted respectively from each of said access points, wherein said status of said access point is embedded in said probe request frame, and an information element is respectively appended to each of said probe request frames and comprises:

an Element ID field for storing an ID of said information element which is different from the other used ID;

a Length field for storing length of said information element, wherein the length is a total amount of bytes counted from the third byte to the last byte of said information element;

a Default Address Group ID field for indicating said default address group ID thereof;

a Current Group ID field for indicating a group ID joined by said access point during operation which enables the other access points to determine whether a specific group exists and operates normally, and said group ID of said specific group is said derivative group ID of said subsidiary topology system which said access point joins;

a Role of AP field which indicates a current role of said access point during operation under said topology system;

a Sequence field which indicates a sequence number of a latest information element known to show existence of said specific group;

a MACofRootAP field which indicates MAC address of said root access point of said specific group;

a Hop Count field which indicates an amount of both wireless and wired links that said access point should pass through to link with a said wired network, wherein one of said links has to be a wired link while the others are wireless links; and a Service Hop Count field which indicates an amount of said access points not directly linked with said wired network but linked with said wired network through the other access points; and said root access points and said pure access points linked back-end therewith respectively forming a subsidiary topology system of said wireless network, wherein, said access points of the same subsidiary topology system transmit data through the same channel, and said channels corresponding to the different subsidiary topology systems are different, so that frames of said pure access point are transmitted to said wired network through said root access point having said derivative group ID identical to that of said pure access point.

2. A topology system of wireless network with dynamic balance of claim 1, wherein said Role of AP field is an information mode field for indicating said current role that said access point is playing when transmitting said information element.

3. A topology system of wireless network with dynamic balance of claim 1, wherein a value is added to said Sequence field each time when said root access point sends said probe request frame having said information element, and the other access points in said specific group takes a maximum value of said Sequence field received as a content to be sent.

4. A topology system of wireless network with dynamic balance of claim 1, wherein each of said root access points writes MAC address thereof into said MACofRootAP field while each of said pure access points writes MAC address of said root access point linked therewith into said MACofRootAP field.

5. A topology system of wireless network with dynamic balance of claim 1, wherein said information element further comprises a RunOutofVport field for indicating whether or not said access point is able to establish a new wireless link.

6. A topology system of wireless network with dynamic balance of claim 5, wherein said RunOutofVport field comprises one of the following modes:
   a mode representing that said access point is not permitted to establish a new wireless link with the other access points; and
   a mode representing that said access point is permitted to establish a wireless link with the other access points, wherein a real time status of network dataflow of said access point must be provided in said RunOutofVport field for the other access points to consider when establishing a wireless link therewith.

7. A topology system of wireless network with dynamic balance of claim 1, wherein said information element further comprises a Channel field for indicating said channel of said specific group.

8. A topology system of wireless network with dynamic balance of claim 1, wherein said information element further comprises an Escape mode field for indicating whether or not said access point is permitted to establish a wireless link with one of the other access points having said default address group IDs different from that of said access point.

9. A topology system of wireless network with dynamic balance of claim 8, wherein said Escape mode field comprises one of the following modes:
   a mode representing that said access point is permitted to be said escape access point;
   a mode representing that said access point is not permitted to be said escape access point; and
   a mode representing that anyone of said access points of said specific group is not permitted to be said escape access point.

10. A topology system of wireless network with dynamic balance of claim 1, wherein said information element further comprises an Unique Selection Link field for indicating that only one of the other access points having a smallest amount in said Hop Count field exists within a signal transmission range of said access point.

11. A topology system of wireless network with dynamic balance of claim 1, wherein said current role indicated in said Role of AP field comprises roles of being said root access point, said pure access point, said initial access point or said escape access point, and said escape access point is linked with said wired network through the other access points having said default address group IDs different from that of said escape access point.

12. A topology system of wireless network with dynamic balance of claim 11, wherein said initial access point automatically detects all of said channels to determine whether or not said topology system exists and, when none of the other access points is detected and said initial access point is not directly linked with said wired network, periodically detects all of said channels to determine whether or not said root access point exists.

13. A topology system of wireless network with dynamic balance of claim 12, wherein, when said initial access point links with said wired network, said initial access point changes status thereof to be said root access point, and operates on said channel having less interference according to a result of detecting said channels used by the other root access points.

14. A topology system of wireless network with dynamic balance of claim 13, wherein said root access point periodically determines whether or not said wired network still exists, and is turned into said initial access point no longer capable of serving said pure access points linked back-end therewith when it is determined that link between said root access point and said wired network is cut.

* * * * *